United States Patent [19]

Chittenden et al.

[11] E Re. 29,656

[45] Reissued June 6, 1978

[54] ADDITIVE TRANSFER UNIT HAVING A SLIDABLE PIERCING MEMBER

[75] Inventors: Richard Marion Chittenden, Grayslake; Peter Lorin Bryant, Lake Bluff; Charles Carlock Classen, Waukegan, all of Ill.

[73] Assignee: Abbott Laboratories, North Chicago, Ill.

[21] Appl. No.: 779,455

[22] Filed: Mar. 21, 1977

Related U.S. Patent Documents

Reissue of:

[64] Patent No.: 3,987,791
Issued: Oct. 26, 1976
Appl. No.: 600,665
Filed: Jul. 31, 1975

U.S. Applications:

[63] Continuation of Ser. No. 465,230, Mar. 29, 1974, abandoned.

[51] Int. Cl.[2] ..... A61J 1/00

[52] U.S. Cl. ..... 128/272.3; 141/329; 222/83

[58] Field of Search ..... 222/80, 81, 83, 83.5, 222/85; 128/218 M, 272, 272.1, 272.3; 141/329, 330

[56] References Cited

U.S. PATENT DOCUMENTS

| | | | |
|---|---|---|---|
| 2,724,383 | 11/1955 | Lockhart | 128/272.1 X |
| 2,726,656 | 12/1955 | Lockhart | 222/81 X |
| 3,033,202 | 5/1962 | Richter et al. | 128/272 |
| 3,207,374 | 9/1965 | Holmes et al. | 222/80 |
| 3,392,726 | 7/1968 | Pochyla et al. | 128/272.1 |
| 3,788,369 | 1/1974 | Killinger | 141/330 X |

*Primary Examiner*—Robert B. Reeves
*Assistant Examiner*—Joseph J. Rolla
*Attorney, Agent, or Firm*—Robert L. Niblack; Neil E. Hamilton

[57] ABSTRACT

An additive container and transfer unit for transferring a solution from the additive container to a container which is under a vacuum, the transfer unit including a closure having a transfer pin or piercing member which is axially movable from a first position to a second position within a supporting member or guide. The additive container and transfer unit is particularly applicable to the transfer of a medicament within the container to a vacuumized parenteral fluid container. In this application, the additive container is inverted and the point of the transfer pin projecting from the closure is positioned on the I.V. fluid bottle stopper. As downward thrust is applied to the additive container, the end of the transfer pin projecting from the closure will pierce the I.V. fluid bottle stopper. As further thrust is applied, the additive container closure will move along the transfer pin, the other end of the transfer pin thereby piercing the diaphragm portion of the stopper within the transfer unit thereby providing a pathway between the two containers through the passageway in the transfer pin. The vacuum within the vacuumized container will then draw the solution within the additive container into the vacuumized container.

7 Claims, 10 Drawing Figures

FIG.2
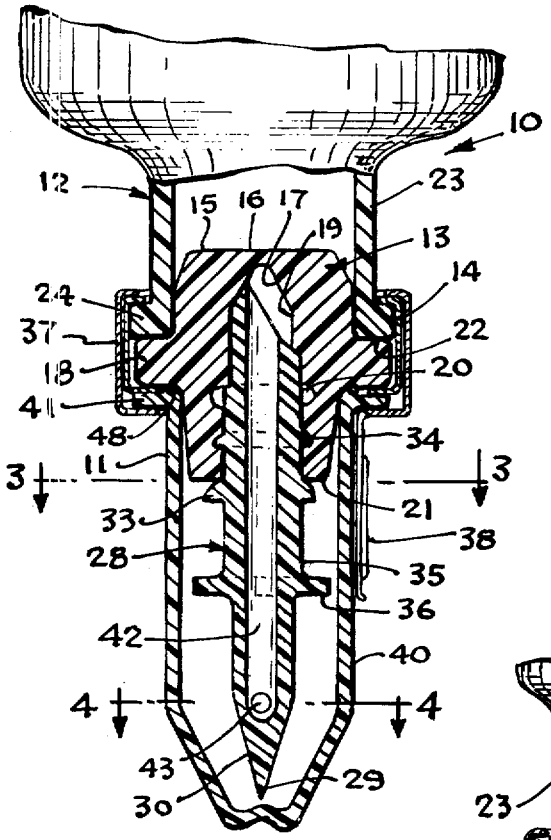
FIG.1
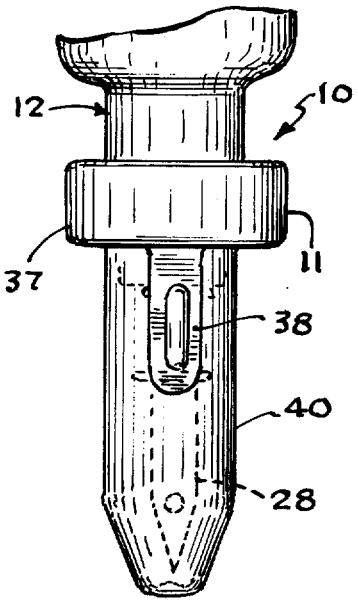
FIG.3
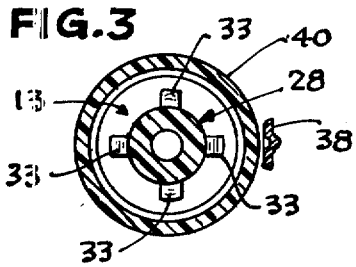
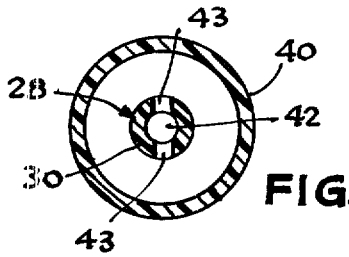
FIG.4
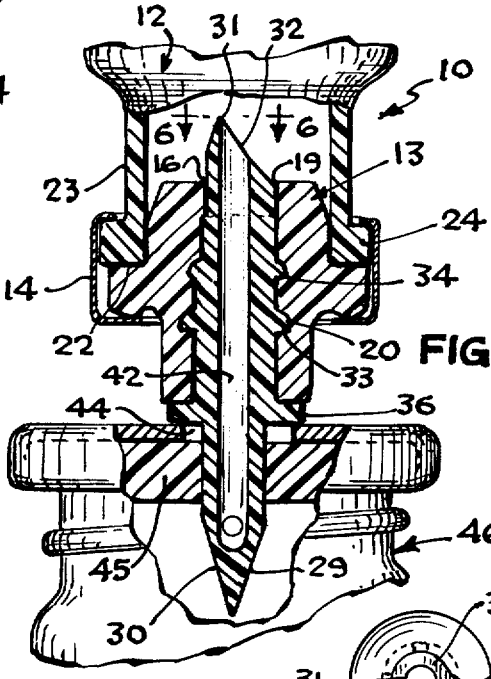
FIG.5
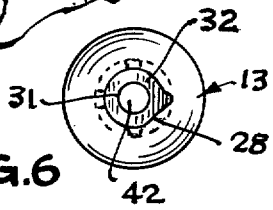
FIG.6

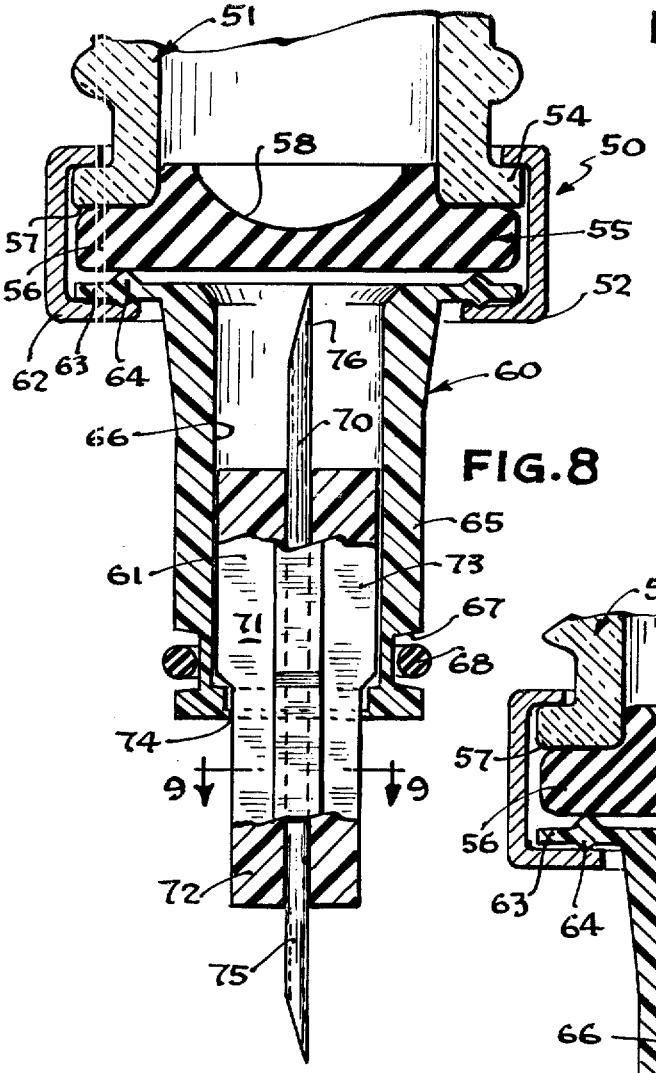
FIG.8
FIG.7
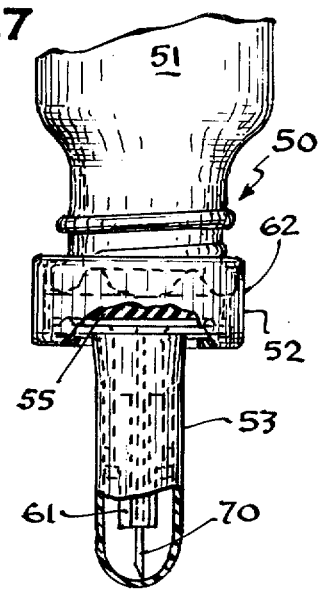
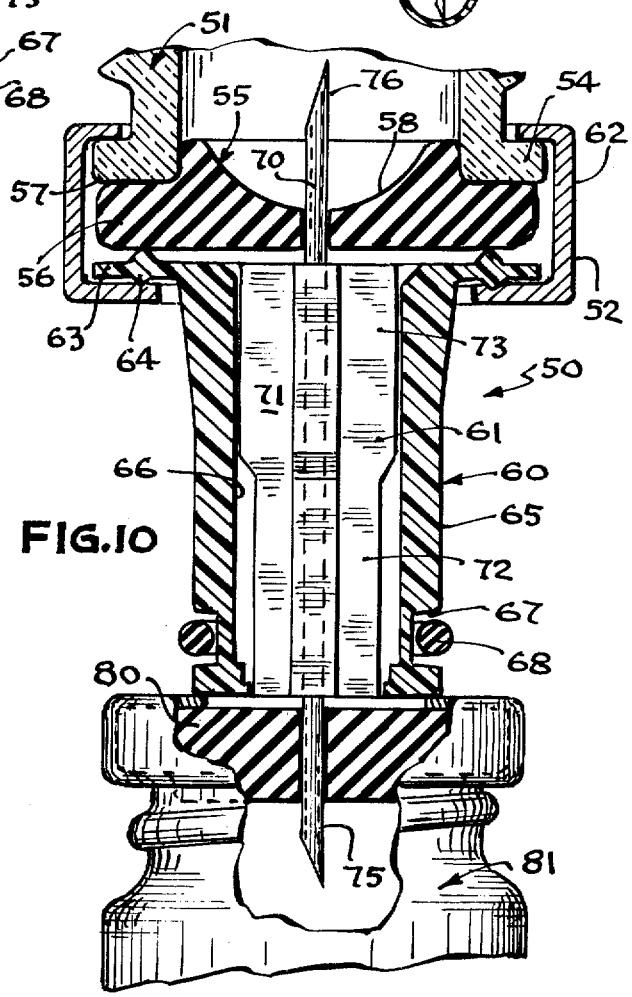
FIG.10
FIG.9
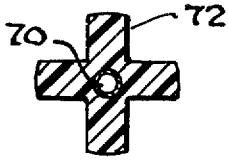

ADDITIVE TRANSFER UNIT HAVING A SLIDABLE PIERCING MEMBER

Matter enclosed in heavy brackets [ ] appears in the original patent but forms no part of this reissue specification; matter printed in italics indicates the additions made by reissue.

This is a continuation, of application Ser. No. 465,230 filed Mar. 29, 1974, now abandoned.

BACKGROUND OF THE INVENTION

In administrating intravenous fluid to a patient, it is oftentimes necessary to add a medicament, such as potassium chloride solution, to the intravenous fluid. Intravenous fluids are mostly packaged in glass bottles which are sealed under a vacuum with rubber stoppers. It is therefore necessary to introduce the medicament through the stopper. One method is by use of a syringe, withdrawing the desired medicament from an ampule or stoppered vial and then injecting the medicament into the I.V. fluid container by puncturing the stopper with the needle of the syringe. Some disadvantages are apparent with this method. For example, use of an ampule results in danger of cut fingers from glass and glass particulate matter, requires the use of an antiseptic swab, includes the possibility for touch contamination, and requires considerable time to effect the transfer since many steps are involved. Likewise with stoppered vials, there is a possibility for touch contamination, the rubber closure of the vial must be cleansed, and the like with the ampule, considerable time is needed to effect the transfer. Additive containers containing the medicament to be added together with a special closure including a piercing pin for piercing the I.V. bottle stopper, such as illustrated in U.S. Pat. No. 3,055,367, are also available. Such containers include a fixed piercing pin with a stopper having an opening therethrough for communicating with the inside of the container. With such units, once opened some fluid may leak out when the unit is positioned for transfer. Additionally, the metal retaining ring which retains the stopper and piercing pin in place is not sterile and comes into contact with the sterile top of the I.V. bottle. With such units it is not possible to effect a partial withdrawal of the contents with a needle and syringe or it can be achieved only with difficulty, using a syringe having a long needle which is then inserted through the piercing pin.

SUMMARY OF THE INVENTION

The additive container and transfer unit of the present invention includes a closure which has a transfer pin axially movable in a central opening in the vial stopper, or otherwise movable from a first position to a second position, the inside end of the stopper being sealed by a puncturable diaphragm portion. The double-ended transfer pin pierces both the I.V. bottle and additive vial stoppers so that transfer is made at that point while the system is completely closed off from the atmosphere. In one embodiment of the invention, after the protective hood is removed, the additive vial is inverted and the point of the transfer pin projecting from the stopper is positioned on the I.V. bottle stopper. When force is applied to the additive container, the end of the transfer pin projecting from the stopper will pierce the I.V. bottle stopper. As further force is applied, the additive vial stopper will move along the transfer pin, the other end of the transfer pin thereby piercing the diaphragm portion of the stopper providing a pathway between the two containers. The vacuum within the I.V. fluid container will then draw the medicament within the additive container into the I.V. fluid container. Accordingly, in a single motion, the additive container and transfer unit is activated and the medicament transferred to the I.V. bottle.

In one embodiment, prior to use, the double-ended transfer pin can be removed and a needle and syringe used to draw out the contents of the additive container. This may be necessary when there is a need for only a partial dose of medicament, where the contents are to be added to an intravenous fluid bottle with depleted vacuum or where the contents are to be added to a flexible I.V. fluid container.

The additive container and transfer unit of the present invention provides a completely closed system, permits rapid transfer of the medicament within the container, is easily adaptable to all I.V. fluid containers which are under a vacuum and have puncturable closures, and can be easily adapted to partial dose requirements and for making additions to flexible I.V. fluid containers.

The invention will be better understood with reference to the following description.

DRAWINGS

FIG. 1 is a side elevational view of one embodiment of the invention illustrating the transfer container and closure in an inverted position;

FIG. 2 is a partial side elevational view, partially in cross section illustrating the transfer container and closure of FIG. 1 prior to use;

FIG. 3 is a cross sectional view as seen along the lines 3—3 of FIG. 2;

FIG. 4 is a cross sectional view as seen along the lines 4—4 of FIG. 2;

FIG. 5 is a cross sectional view, partially in cross section illustrating use of the transfer container and closure with a parenteral solution container;

FIG. 6 is a plan view as seen along the lines 5—5 of FIG. 5;

FIG. 7 is a partial side elevational view, partially in cross section illustrating another embodiment of the invention;

FIG. 8 is a partial side elevational view in cross section of the transfer container and closure of FIG. 7;

FIG. 9 is a cross sectional view as viewed along the lines 9—9 of FIG. 8; and FIG. 10 is a partial side elevational view, partially in cross section illustrating the transfer container and closure and used in conjunction with a parenteral solution container.

DETAILED DESCRIPTION

Referring to FIGS. 1 through 7 of the drawings, the additive transfer container 10 comprises a closure portion 11 and container 12. As best seen in FIG. 2, the closure 11 includes a stopper 13 which is affixed to the finish 22 of the neck 23 of the container 12 by an inner ferrule 14. The stopper 13 includes an annular shoulder 18 which abuts the finish 22 of the container neck 23 and is sealed thereto by the inner ferrule 14; the ferrule being crimped over the shoulder 18 and the bead 24 on the neck 23. The stopper 13 includes a central opening 19 which extends along the longitudinal axis of the stopper 13, the end 15 of the stopper 13 which projects into the neck 23 of the container 12 being sealed by a puncturable diaphragm 16. Preferably, the end 17 of the opening 19 in the stopper 13 is of reduced diameter and tapers inwardly to guide the piercing pin 28 as hereinafter described. An annular undercut 20 is formed in the central opening 19 of the stopper 13, spaced away from the open end 21 thereof and serves to retain the transfer pin 28 in place as hereinafter described. The double ended transfer pin 28 is disposed within the central opening 19 of the stopper 13. The transfer pin 28 is double ended, i.e., has a point at both ends, the point 29 on the proximal end 30 of the pin 28 being for the purpose of puncturing the stopper 45 in a parenteral solution container as hereinafter described, the point 31 on the distal end 32 of the transfer pin 28 being for the purpose of puncturing the diaphragm 16 of the stopper 13. The transfer pin 28 includes annular spaced projection 34 and barbs or nibs 33 extending outwardly from the body 35 of the transfer pin 28 as well as an annularly projecting shoulder or stop 36. A longitudinal passageway 42 extends through the transfer pin 28, the distal end 32 being open. As illustrated, the proximal end 30 is closed and pointed but includes opposed expulsion ports 43 for release of the additive medicament into the I.V. bottle.

Prior to use, the transfer pin 28 is positioned in the central opening 19 of the stopper 13 as illustrated in FIG. 2, the annular projection 34 in the transfer pin 28 exerting pressure against the stopper 13 to prevent the leakage of air around the transfer pin 28 and through the central opening 19 when entry is made as illustrated in FIG. 5. A hood 40 is positioned on the stopper 13, the flange portion 41 of the hood 40 resting on the inner ferrule 14 which holds the stopper 13 on the neck 23 of the container 12. An annular ridge 48 formed in the flange portion 41 of the hood 40, projecting toward the stopper 13 provides an effective seal between the closure 11 and stopper 13. An outer ferrule 37 is crimped in place over the flange 41 of the hood 40 and the bead 24 extending from neck 23 of the bottle to hold the entire assembly 11 in place. To facilitate removal of the outer ferrule 37 or tamperproof seal, a tear-tab 38 can be formed thereon.

In use, the tamperproof metal seal or outer ferrule 37 is removed by grasping the tear-tab 38 and applying force to tear the seal 37. Removal of the seal 37 releases the rigid plastic hood 40 which protects the sterile integrity of the piercing pin 28 prior to use. The hood 40 is removed and discarded thereby exposing the transfer pin 28. The additive container 10 is thereafter inverted and the transfer pin 28 aligned with the diaphragm or opening 44 in the stopper 45 of a parenteral solution container 46. A single thrust of the additive container 10 will activate the unit, the proximal end 30 of the transfer pin 28 piercing the diaphragm 44 or passing through the opening in the stopper 45 in the parenteral solution bottle 46. As the transfer container 10 is thrust downwardly, the stop 36 on the transfer pin 28 will abut the surface of the stopper 45 on the parenteral solution container 46. Thereafter the transfer pin 28 will remain stationary and with continued force, the distal end 32 of the transfer pin 28 will slide along the central opening 19 in the stopper 13 of the additive container 10 with the point 31 thereof piercing the diaphragm 16 in the stopper 13. When entry is made through both stoppers, a pathway will be provided through the passageway 42 in the double ended transfer pin 28 and accordingly, the vacuum within the parenteral solution container 46 will draw the additive solution from the additive container 12 through the transfer pin 28 and expulsion ports 43 into the I.V. container 46. With the embodiment as illustrated, 10 milliliters of additive solution can be transferred in two seconds or less. As force is applied, the transfer pin 28 will move from a first position as illustrated in FIG. 2 to a second position as illustrated in FIG. 5, the projection 33 on the transfer pin 28 thereby fitting within the undercut 20 in the stopper 13. When the container 10 is withdrawn, the cannula of an administration set (not shown) can be inserted into the stopper of the parenteral solution container for the purpose of administering the solution to a patient.

With the transfer container 10 of the present invention, there is no possibility of leakage of fluid from the additive container 12 when positioned for transfer to an I.V. bottle. In contrast, many such transfer containers have an open passage through the closure thereof so that when inverted, leakage of fluid can result. Further, with the transfer container 10, the transfer pin 28, stopper 13 area, hood 40 and seal 37 can be sterilized prior to putting the assembly in place. Consequently, since the seal 37, which comes in contact with the atmosphere, is removed prior to use; only sterile surfaces will come in contact. As can be seen in FIG. 5, the stop 36 of the sterile pin 28 comes into contact with the sterile top of the I.V. container 46 stopper 45. Accordingly, any contamination of the I.V. solution within the container 46 due to contact with unsterile surfaces is minimized.

If necessary, access to the additive solution within the additive container 12 can be achieved by a syringe and needle. The seal 37 and hood 40 is removed as previously described thereby exposing the transfer pin 28. At this point, the transfer pin 28 can be withdrawn from the stopper 13 and the needle of a syringe inserted through the diaphragm 16 in the stopper 13 of the additive container 10. Additive solution within the container 12 can then be withdrawn into the syringe. This technique can be useful if the vacuum within the parenteral solution bottle has been depleted, if transfer to a flexible plastic I.V. container is required, or if only a part of the contents of the additive container is desired.

FIGS. 7 through 10 illustrate another embodiment of the present invention utilizing a metal needle insert molded in a plastic hub. Referring to FIG. 7, the additive transfer unit 50 of this embodiment comprises a container 51 for storing the additive medicament and a closure portion 52 including a protective hood 53. As best seen in FIG. 8 which illustrates the unit 50 with the hood 53 removed and ready to use, the unit 50 comprises a container 51 or bottle having a projecting bead 54 on the neck thereof. The closure portion 52 comprises a puncturable stopper 55 including an annular shoulder 56 for abutment with the finish 57 of the container 51 and a diaphragm portion 58. A tubular member 60 for retaining the piercing member 61 is positioned on the stopper 55 and a metal ferrule 62 is crimped over the bead 54 of the bottle 51 and the annular flange 63 extending from the tubular member 60 to retain the closure 52 in place. The flange 63 of the tubular member 60 may include an annular ridge 64 on both sides thereof to provide a more effective seal between the stopper 55 and the tubular member 60 and to provide a better crimping surface for the ferrule 62. The cylindrical portion 65 of the tubular member 60 includes a central opening 66 therethrough in which is positioned the piercing member 61. If desired, an undercut 67 can be formed in the cylindrical portion for retaining an 0 ring 68 and provide a more effective seal when the protective hood 53 is positioned in place as illustrated in FIG. 7.

The piercing member 61 comprises a metal cannula 70 or needle insert molded in a plastic hub 71, the diameter of the hub 71 being coextensive with the diameter of the opening 66 through the tubular member 60 to prevent leakage of fluid while at the same time permitting the hub 71 to reciprocate or slide with in the opening 66. The length of the double ended needle 70 is longer than the length of the hub 71 so that the pointed ends thereof project from either end of the hub 71. To provide a more effective seal, a portion 72 of the hub which extends from the tubular member 60 prior to use of the unit 50 can be formed of a smaller diameter than the remaining portion 73, with the opening 74 on the end of the tubular member 60 being of such diameter as to mate with the smaller portion 72 of the hub 71. Such a construction will also prevent accidental release of the piercing member 61 from the closure 52.

As with the previously described embodiment, the unit 50 is put in use by removing the protective hood 53 which is retained on the tubular member 60 by means of a spot weld to protect the sterile integrity of the piercing member 61 and other exposed portions of the closure 52. The unit 50 is then put in place on the stopper 80 of a parenteral solution container 81 and pushed downwardly whereby the proximal end 75 of the needle 70 will puncture the stopper 80 in the parenteral solution container 81. Further pressure will cause the tubular member 60 of the closure 52 to slide along the hub 71 whereby the distal end 76 of the needle 70 will puncture the stopper 55 on the additive container 51 thereby providing a fluid flow path from the additive container 51 to the parenteral solution container 81. The additive medicament will thereby be drawn into the parenteral solution container 81. The additive unit 50 can then be withdrawn and the parenteral solution container 81 containing the medicament arranged for infusion of the solution to the patient.

What is claimed is:

1. An additive transfer unit for storing and transferring of a medicament to a *solution* container having an exposed closure [and a vacuum therein];

said transfer unit comprising [a] *an additive* container for storing the medicament to be transferred, said *additive* container having a rigid neck portion defining a finish, the opening in said *additive* container being sealed by a closure affixed thereto;

said closure having a shoulder for resting against said finish of the rigid container neck, said closure including a puncturable stopper with a pierceable diaphragm portion positioned in sealing engagement with the opening in the *additive* container and in a substantially stationary manner;

a tubular member having a cylindrical portion, the cylindrical portion including a central opening therein for slidably receiving a piercing member;

said tubular member including an undercut in the outside surface of the cylindrical portion thereof, sealing means positioned in said undercut;

a hood engageable with the cylindrical portion of the tubular member and the sealing means to cover the piercing member and tubular member prior to use of the unit;

said tubular member being positioned and arranged so that the opening therein overlies the diaphragm portion of said stopper;

crimping means to affix the closure and tubular member to the *additive* container;

said piercing member being positioned within said central opening in said member and having a passageway therethrough for the flow of said medicament and a point on both ends thereof;

said piercing member having an integral stop and being movable from the first position for entry through the closure of the [vacuumized] *solution* container with said integral stop constructed and arranged to contact said exposed closure of [vacuumized] *said solution* container to a second position for puncturing of the stopper in the additive container to thereby provide a pathway between the containers and permit the medicament within the additive container to transfer into the [vacuumized] *solution* container.

2. The additive transfer unit of claim 1 wherein said tubular member includes an annular flange extending from one end thereof, the flange being positioned on the stopper so that the opening within the cylindrical portion overlies said stopper, and said crimping means for affixing said closure and tubular member to said *additive* container includes a ferrule crimped about the flange and container to affix said member and stopper to the *additive* container.

3. The additive transfer unit of claim 2 wherein the piercing member comprises a needle having a hub, the diameter of the hub being coextensive with the central opening through the tubular member to thereby prevent leakage of fluid while at the same time permitting the hub to slide within the central opening, the length of the needle being longer than the length of the hub so that the pointed ends thereof project from either end of the hub.

4. An additive transfer unit for storing and transferring of a medicament to a *solution* container having an exposed closure [and a vacuum therein];

said transfer unit comprising [a] *an additive* container for storing the medicament to be transferred, said *additive* container having a rigid neck portion defining a finish, the opening in said container being sealed by a closure affixed thereto;

said closure having a shoulder for resting against said finish of the rigid container neck, said closure including a puncturable stopper positioned in sealing engagement with the opening in the *additive* container and in a substantially stationary manner, and means for affixing the stopper to the *additive* container;

said stopper including a central opening extending along the longitudinal axis thereof for slidably receiving a piercing member, the end of the stopper projecting into the container being sealed by a puncturable diaphragm;

a piercing member having a passageway therethrough for the flow of said medicament and a point on both ends thereof and disposed within the central opening in said stopper, one end of the piercing member extending from said opening;

said piercing member having an integral stop and being movable from a first position for entry through the closure of the [vacuumized] *solution* container with said integral stop contacting said exposed closure of the [vacuumized] *solution* container to a second position for puncturing of the diaphragm of the stopper in the additive container to thereby provide a pathway between the containers and permit the said medicament within the additive container to transfer into the [vacuumized] *solution* container;

said integral stop of the piercing member including an annular shoulder extending from the body thereof at a point in the portion of the piercing member which extends from the central opening in the stopper, said shoulder preventing excessive movement of the piercing member in the central opening in the stopper when the piercing member is inserted in the closure of [a vacuumized] *said solution* container;

said piercing member including an elongated body with said point on either end thereof and a projection extending from the body intermediate the ends thereof;

the central opening within the stopper including an undercut to receive the projection on the piercing member when the piercing member is moved from the first position to the second position within the central opening in the stopper for puncturing of the diagram of the stopper whereby the projection on the piercing member will engage the undercut in the opening in the stopper to thereby retain the piercing member within the opening in the stopper when the transfer unit is withdrawn from the [vacuumized] *solution* container.

5. The additive transfer unit of claim 4 including a hood for protecting the piercing member and stopper prior to use, said hood having a flange extending from the open end thereof, the flange of the hood overlying said stopper, and means for affixing the hood to the *additive* container.

6. The additive transfer unit of claim 5 wherein the means for affixing the hood to the *additive* container comprises a tamperproof, removable seal fastened to the *additive* container and hood so that upon removal of the seal, the hood can be removed to expose the piercing member.

*7. The additive transfer unit as defined in claim 4 wherein said solution container is vacuumized.*

* * * * *